United States Patent
Yerramalli et al.

(10) Patent No.: US 11,083,013 B2
(45) Date of Patent: Aug. 3, 2021

(54) UE/GNB TRANSMISSION DETECTION AND IMPACT ON RELIABILITY

(71) Applicant: QUALCOMM Incorporated, San Diego, CA (US)

(72) Inventors: Srinivas Yerramalli, San Diego, CA (US); Seyed Ali Akbar Fakoorian, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/424,221

(22) Filed: May 28, 2019

(65) Prior Publication Data
US 2019/0373636 A1 Dec. 5, 2019

Related U.S. Application Data

(60) Provisional application No. 62/679,421, filed on Jun. 1, 2018.

(51) Int. Cl.
*H04W 4/00* (2018.01)
*H04W 74/08* (2009.01)
(Continued)

(52) U.S. Cl.
CPC ......... *H04W 74/0808* (2013.01); *H04L 1/189* (2013.01); *H04L 5/0055* (2013.01);
(Continued)

(58) Field of Classification Search
CPC ........... H04W 72/0493; H04W 72/042; H04W 74/0808; H04W 80/02; H04W 76/27;
(Continued)

(56) References Cited

U.S. PATENT DOCUMENTS

2016/0066195 A1* 3/2016 Moon ................... H04L 5/0091
455/454
2017/0202022 A1 7/2017 Chendamarai et al.
(Continued)

FOREIGN PATENT DOCUMENTS

WO WO-2017165405 A2 9/2017

OTHER PUBLICATIONS

Qualcomm Incorporated (dated Feb. 15-19, 2016), R1-160888 "Pucch design details" (Year: 2016).*
(Continued)

*Primary Examiner* — Maharishi V Khirodhar
(74) *Attorney, Agent, or Firm* — Liem T. Do

(57) ABSTRACT

A method of wireless communication includes receiving, by a user equipment (UE) from a base station, downlink transmissions, and performing, by the UE, a listen before talk (LBT) procedure in an LBT occasion provisioned, by the base station, for the UE immediately prior to an uplink transmission that includes an acknowledgement of a downlink transmission. The method also includes transmitting, by the UE to the base station, the uplink transmission based on results of the LBT procedure. In another aspect, a method of wireless communication includes provisioning, by a base station for all served UEs, are LBT occasion immediately prior to an uplink transmission by the UEs. The uplink transmission includes an acknowledgement of a downlink transmission. The method additionally includes transmitting, by the base station to the UEs, downlink transmissions, and receiving, by the base station, the uplink transmission.

44 Claims, 9 Drawing Sheets

(51) Int. Cl.
*H04W 72/04* (2009.01)
*H04L 1/18* (2006.01)
*H04W 80/02* (2009.01)
*H04W 76/27* (2018.01)
*H04L 5/00* (2006.01)

(52) U.S. Cl.
CPC ..... *H04W 72/042* (2013.01); *H04W 72/0493* (2013.01); *H04W 76/27* (2018.02); *H04W 80/02* (2013.01)

(58) Field of Classification Search
CPC ........ H04W 4/06; H04L 1/189; H04L 5/0055; H04L 1/1854; H04L 5/0035

See application file for complete search history.

(56) References Cited

U.S. PATENT DOCUMENTS

| | | |
|---|---|---|
| 2017/0251464 A1 | 8/2017 | Mukherjee |
| 2017/0332358 A1* | 11/2017 | Park ..................... H04W 72/042 |
| 2017/0346613 A1* | 11/2017 | Fan ....................... H04W 72/12 |
| 2018/0191547 A1* | 7/2018 | Mukherjee ........ H04W 72/0446 |
| 2019/0150193 A1* | 5/2019 | Harada ............... H04W 74/085 |
| | | 370/329 |
| 2019/0200379 A1* | 6/2019 | Wang ................ H04W 72/1268 |
| 2019/0261412 A1* | 8/2019 | Novlan ................. H04W 16/14 |

OTHER PUBLICATIONS

OPPO (Feb. 15-19, 2016), R1-160594 (Year: 2016).*
LG Electronics, R1-160630, "LBT scheduling in LAA UL" (Year: 2016).*
International Search Report and Written Opinion—PCT/US2019/034426—ISA/EPO—dated Aug. 20, 2019 (183382WO).

* cited by examiner

UE/GNB TRANSMISSION DETECTION AND IMPACT ON RELIABILITY

CROSS-REFERENCE TO RELATED APPLICATIONS

This application claims priority to U.S. Provisional Application No. 62/679,421, entitled "UE/gNB TRANSMISSION DETECTION AND IMPACT ON RELIABILITY," filed Jun. 1, 2018, the disclosure of which is hereby incorporated herein by reference.

TECHNICAL FIELD

Aspects of the present disclosure relate generally to wireless communication systems, and more particularly, to UE/gNB transmission detection and impact on reliability.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the do clink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

Ultra reliable and low latency communications (URLLC) is a new service category in 5G to accommodate emerging services and applications having stringent latency and reliability requirements. URLLC-Unlicensed (URLLC-U) extends URLLC to the unlicensed spectrum, while still allowing use of the licensed and/or shared spectrum. URLLC-U needs to satisfy strict requirements for reliability (e.g., packet loss no greater than one packet in one-million) and latency (e.g., 10 ms) even in the presence of unwanted interferers, as may be common in the unlicensed spectrum. A key difference between licensed transmission and unlicensed frame based equipment (FBE) based transmission is to model the uncertainty due to transmission in the unlicensed scenario. Transmission uncertainty can impact various procedures which need to made more robust and thus cost more resources. The present disclosure presents procedures that address this issue, but these procedures also find application in other wireless technologies, such as in-band communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication includes receiving, by a user equipment (UE) from a base station, one or more downlink transmissions. The method additionally includes performing, by the UE, at least one listen before talk (LBT) procedure in at least one LBT occasion provisioned, by the base station, for the UE immediately prior to at least one uplink transmission of one or more uplink transmissions by the UE. The at least one uplink transmission includes an acknowledgement of at least one downlink transmission of the one or more downlink transmissions. The method also includes transmitting, by the UE to the base station, the at least one uplink transmission based on results of the at least one LBT procedure.

In another aspect, a method of wireless communication includes provisioning, by a base station for all user equipments (UEs) served by the base station, at least one listen before talk (LBT) occasion immediately prior to at least one uplink transmission of one or more unlink transmissions by the UEs. The at least one uplink transmission includes an acknowledgement of at least one downlink transmission of one or more downlink transmissions. The method additionally includes transmitting, by the base station to the UEs, the one or more downlink transmissions, and receiving, by the base station from at least one of the UEs, the at least one uplink transmission.

In another aspect, an apparatus for wireless communication has means for receiving, by a user equipment (UE) from a base station, one or more downlink transmissions. The apparatus additionally has means for performing, by the UE at least one listen before talk (LBT) procedure in at least one LBT occasion provisioned, by the base station, for the UE immediately prior to at least one uplink transmission of one or more uplink transmissions by the UE. The at least one uplink transmission includes an acknowledgement of at least one downlink transmission of the one or more downlink transmissions. The apparatus also has means for transmitting, by the UE to the base station, the at least one uplink transmission based on results of the at least one LBT procedure.

In another aspect, an apparatus for wireless communication has means for provisioning, by a base station for all user equipments (UEs) served by the base station, at least one listen before talk (LBT) occasion immediately prior to at least one uplink transmission of one or more uplink transmissions by the UEs. The at least one uplink transmission includes an acknowledgement of at least one downlink transmission of one or more downlink transmissions. The apparatus additionally has means for transmitting, by the base station to the UEs, the one or more downlink transmissions, and means for receiving, by the base station from at least one of the UEs, the at least one uplink transmission.

In another aspect, an apparatus for wireless communication has at least one computer processor and at least one memory coupled to the at least one computer processor. The at least one computer processor is configured to receive, by a user equipment (UE) from a base station, one or more downlink transmissions. The at least one computer processor is additionally configured to perform, by the UE, at least one listen before talk (LBT) procedure in at least one LBT occasion provisioned, by the base station, for the UE immediately prior to at least one uplink transmission of one or more uplink transmissions by the UE. The at least one uplink transmission includes an acknowledgement of at least one downlink transmission of the one or more downlink transmissions. The at least one computer processor is also configured to transmit, by the UE to the base station, the at least one uplink transmission based on results of the at least one LBT procedure.

In another aspect, an apparatus for wireless communication has at least one computer processor and at least one memory coupled to the at least one computer processor. The at least one computer processor is configured to provision, by a base station for all user equipments (UEs) served by the base station, at least one listen before talk (LBT) occasion immediately prior to at least one uplink transmission of one or more uplink transmissions by the UEs. The at least one uplink transmission includes an acknowledgement of at least one downlink transmission of one or more downlink transmissions. The at least one computer processor is also configured to transmit, by the base station to the UEs, the one or more downlink transmissions, and receive, by the base station from at least one of the UEs, the at least one uplink transmission.

In another aspect, a computer-readable medium has instructions recorded thereon that, when enacted by one or more computer processors, cause the one or more computer processors to receive, by a user equipment (UE) from a base station, one or more downlink transmissions. The instructions additionally cause the one or more computer processors to perform, by the UE, at least one listen before talk (LBT) procedure in at least one LBT occasion provisioned, by the base station, for the UE immediately prior to at least one uplink transmission of one or more uplink transmissions by the UE. The at least one uplink transmission includes an acknowledgement of at least one downlink transmission of the one or more downlink transmissions. The instructions also cause the one or more computer processors to transmit, by the UE to the base station, the at least one uplink transmission based on results of the at least one LBT procedure.

In another aspect, a computer-readable medium has instructions recorded thereon that, when enacted by one or more computer processors, cause the one or more computer processors to provision, by a base station for all user equipments (UEs) served by the base station, at least one listen before talk (LBT) occasion immediately prior to at least one uplink transmission of one or more uplink transmissions by the UEs. The at least one uplink transmission includes an acknowledgement of at least one downlink transmission of one or more downlink transmissions. The instructions additionally cause the one or more computer processors to transmit, by the base station to the UEs, the one or more downlink transmissions, and receive, by the base station from at least one of the UEs, the at least one uplink transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein, in other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label h a dash and a second label that distinguishes among the similar components, if just the first reference label is used in the specification, the description is applicable to any one of the similar components having the same first reference label irrespective of the second reference label.

DETAILED DESCRIPTION

Figure 1:
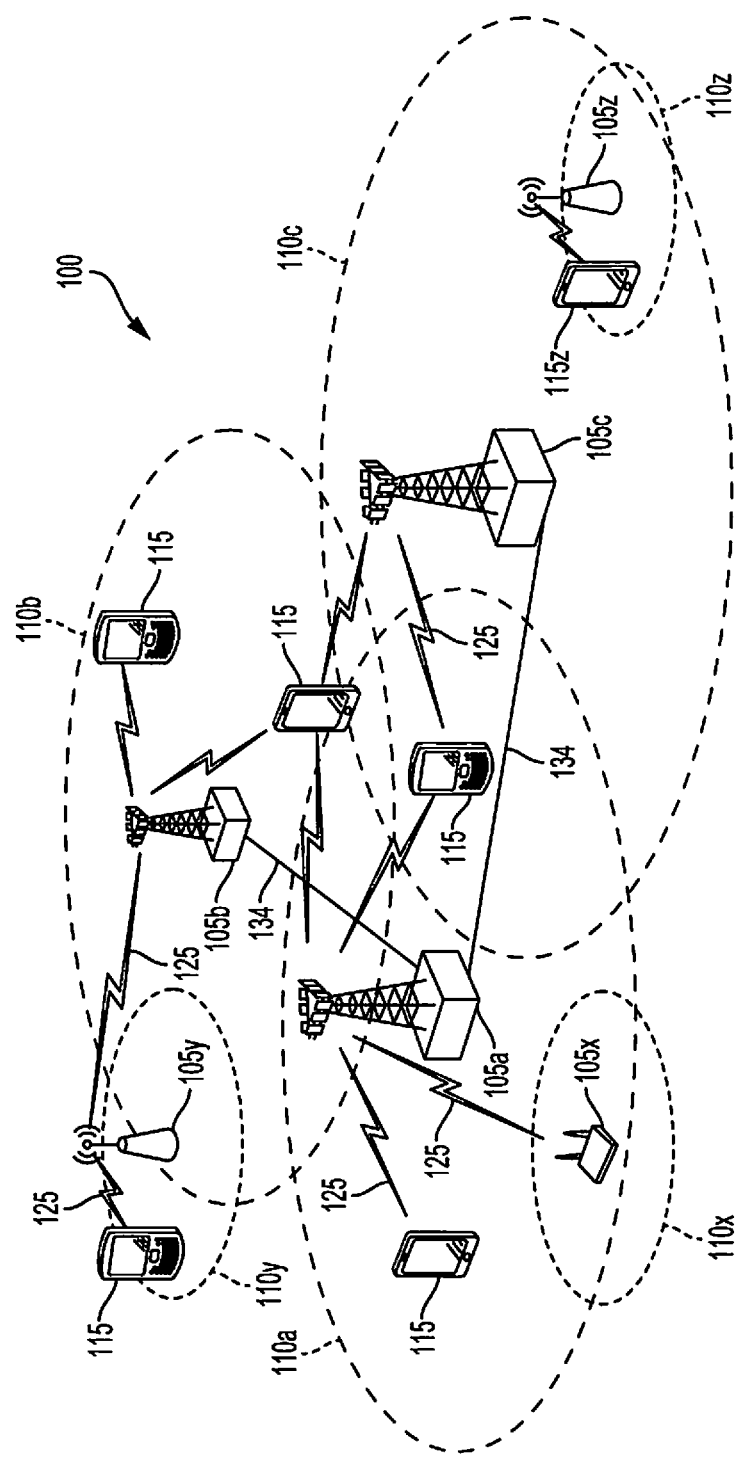
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000 and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, (E-UTRA), and GSM are part of universal mobile telecommunication system (UMTS). In particular, UE is a release of UMTS that uses E-UTRA. UTRA, E-UTRA, GSM, UMTS and UE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (UE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications, indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution, FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB, A gNB for a small cell may be referred to as a small cell gNB, a pico gNB, femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC) notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico femto gNBs, relays, and the like. In FIG. 1, a lightning bolt (e.g., communication links 125) indicates wireless transmissions between a UE and a serving gNB, which is a gNB designated to serve the LTE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
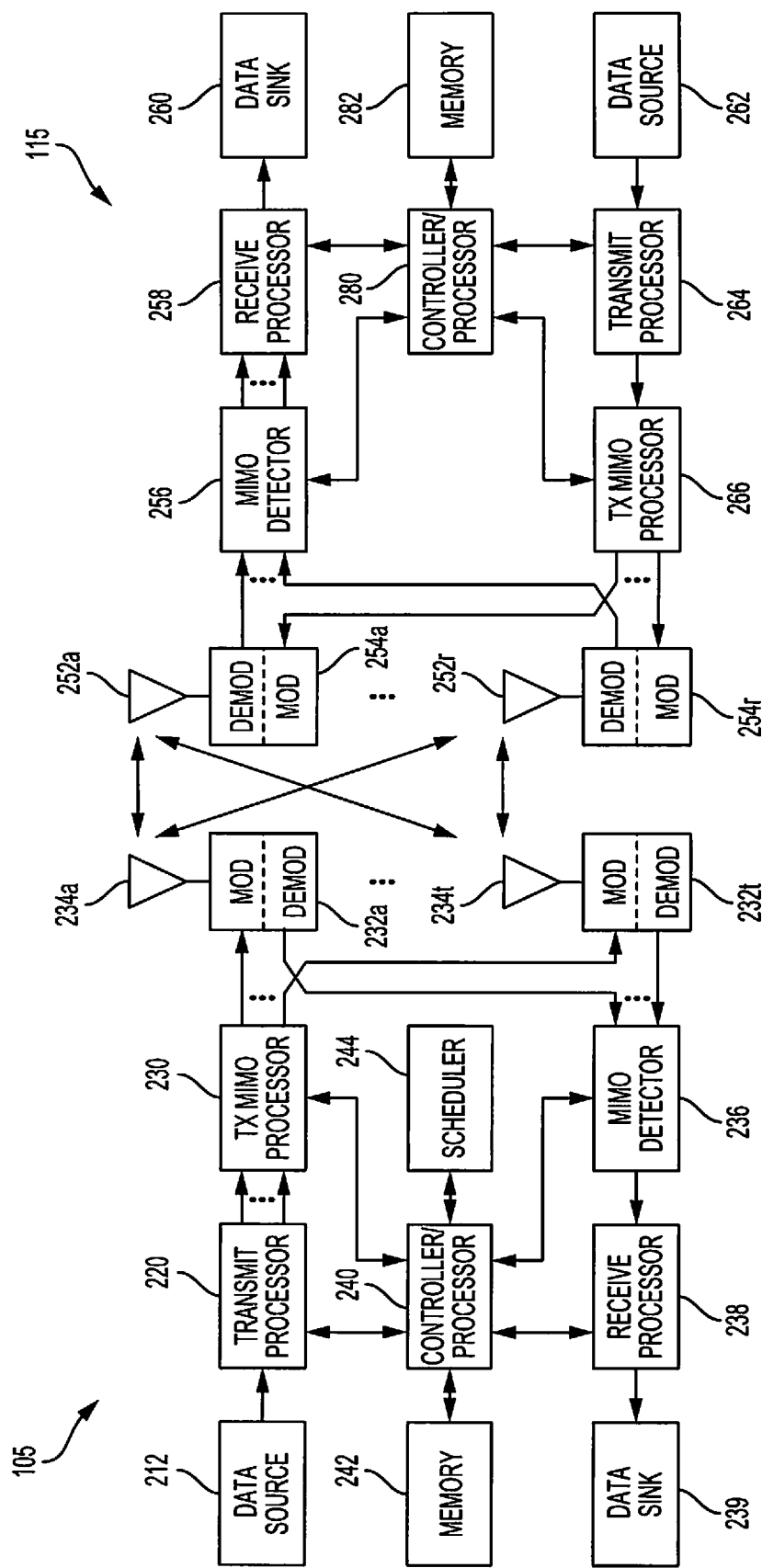
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be TIE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 265 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for gNB 105 and UE 115, respectively. Scheduler 244 may schedule UEs for data transmission on the downlink and/or uplink.

The present disclosure proposes various procedures that address issues arising from transmission uncertainty, which can impact various procedures that need to made more robust and thus cost more resources. In license assisted access (LAA), multi-fire (MF), and NR-U (to some extent), transmission detection has been considered a necessary step to operate in the unlicensed spectrum. Transmission detection is accomplished by detecting the common physical downlink control channel (CPDCCH) as set forth in section 13A of the current LAA standard specification. If a UE detects PDCCH with downlink control information (DCI) cyclic redundancy check (CRC) scrambled by component carrier radio network temporary identity (CC-RNTI) in subframe n, and the UE does not detect PDCCH with DCI CRC scrambled by CC-RNTI in subframe n-1, and if the number of occupied OFDM symbols for subframe n indicated by the subframe configuration for LAA field in subframe n is less than 14, the UE is not required to receive any other physical channels in subframe n except for PDCCH with DCI format 0A/0B/4A/4B if configured. If a UE does not detect PDCCH with DCI CRC scrambled by CC-RNTI containing 'Subframe Configuration for LAA' field set to other than '1110' and '1111' in subframe n and the UE does not detect PDCCH with DCI CRC scrambled by CC-RNTI containing 'Subframe Configuration for LAA' field set to other than '1110' and '1111' in subframe n-1, the UE is not required to use subframe n for updating CSI measurement.

In LAA, there seem to be two key issues addressed with transmission detection at the UE. The issues are addressed in part by reducing or eliminating the impact of processing "potential" partial subframes with unknown configuration. The issues are addressed in further part by determining whether the CSI reference resources in that subframe are valid for updating the CSI measurement. In both cases, the actual outcome is left up to UE implementation. It is envisioned that a "super UE," which has additional hardware, may process a subframe without knowing the partial subframe configuration, and in some cases can detect whether CSI-RS is transmitted. For example, the "super UE" may Use cell reference signal (CRS) detection in symbol 0 and detects a PDCCH addressed to the UE. In this case, the UE still reports the CSI, but whether it reports an updated CSI or an older CSI is left up to implementation.

In MF, there are some additional use cases for detecting transmission for transmitting uplink control information (UCI). Multi-fire short physical uplink control channel (MF-sPUCCH) is transmitted using Format 0 in subframe 'n' if the UCI consists of only positive scheduling request (SR) and the UE does not detect PDCCH with CC-RNTI on subframe 'n' or in subframe 'n-1' and if SF 'n' is an occasion for transmitting SR. MF-sPUCCH is transmitted using Format 0/1/2/3, for all UCI, and if the UE detects CPDCCH in subframe 'n' or 'n-1', it may indicate a sPUCCH resource is present in SF 'n'. In ME, a transmission window can be defined for SR, periodic CSI, etc. around the nominal reporting instance. Whenever a valid resource is detected within the window, then the UE can perform transmission of SR, periodic CSI, etc. Also, for SR, the type of LBT is determined by whether or not a UE detects gNB transmission. A full LBT may be performed if gNB transmission is not detected or a short LBT may be performed if gNB transmission is detected. MF ePUCCH is transmitted when CPDCCH indicates the presence of ePUCCH resources in subframe 'n', and the hybrid automatic repeat request acknowledgment (HARQ-ACK) payload is also decided based on whether or not the transmission has occurred previously on sPUCCH.

Figure 3:
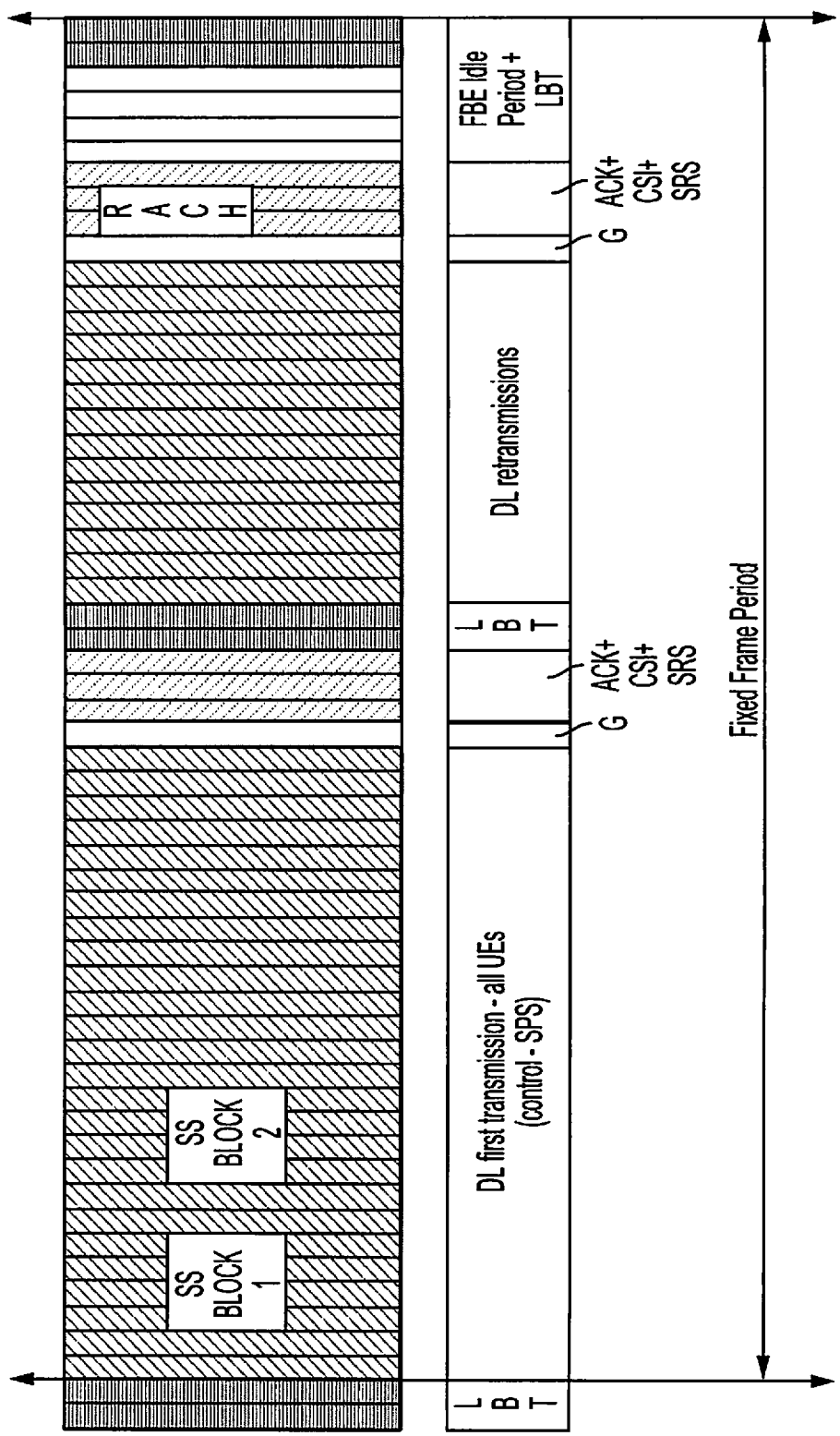
FIG. 3 is a block diagram illustrating transmission by frame based equipment according to new radio unlicensed (NR-U) according to some embodiments of the present disclosure.

Turning to FIG. 3, transmission by frame based equipment according to new radio unlicensed (NR-U) is shown in a manner that will be readily understood by a person having ordinary skill in the art of wireless communications. Notably, there are no LBT occasions provided immediately prior to the occasions for uplink acknowledgement of downlink transmissions and retransmissions. Considering a first scenario, all DL transmission may be scheduled by a PDCCH, which means that there is no semi persistent scheduling (SPS). Accordingly a UE cannot distinguish between a lost DL grant and no transmission from the gNB if there is no other indication of the gNB transmission (e.g., Common PDCCH, SSB, etc.) This scenario applies for the licensed spectrum as well as there is no universal method to detect a transmission from a gNB. The UE skips transmission of ACK/NACK in this scenario. According to a first procedure, if the UE does not detect a transmission from the gNB, then the UE has to skip any UL transmissions (including SRS, P/SE-CSI, SR, etc.) before the next DL transmission instance within the fixed frame period (FFP). According to a second procedure, the UE does not skip transmission detection in the later pail of the FFP, even if it misses the transmission detection in the earlier part of a FFP.

In another scenario, DL may be scheduled by SPS (without a PDCCH). In this case, if the UE decodes the PDSCH incorrectly, it cannot determine whether the failure is due to incorrect decoding or missed transmission from the gNB. As the transmission is scheduled by SPS, the UE should report a NACK. However, if 1 bit ACK/NACK reporting is implemented with ON/OFF keying as in LTE Format 1, then the UE does not report anything. Also, the UE may not have any UL transmissions by regulation as it is not certain if the gNB has captured the frame. For DL retransmissions, the gNB is aware of its own transmission status and hence can determine that absence of ACK (or DTX) implies that the UE has missed the gNB transmission when the gNB actually transmitted.

In a further scenario Lit transmissions may be scheduled by SPS. In this case, if the UE does not detect the gNB frame, then the UE cannot transmit on the UL. Also, the gNB has to detect absence of UE transmission and schedule a retransmission.

A proposal to address some of these issues include configuration of the UE with a very high reliability signal that can be used to detect transmissions from the gNB. Such a signal ensures that the UE can transmit ACK/NACK, CQI, SR, etc. even when it does not detect any PDCCH or PDSCH on the DL. One option under this proposal involves synchronization signal block (SSB) utilization such as PSS+SSS+PBCH resource validation assuming PBCH payload is predictable. Another option under this proposal involves utilizing multi-port CSI-RS. Yet another option under this proposal involves use of a Common PDCCH with a large aggregation level to enable robust detection.

Another proposal according to the present disclosure involves configuring the UE to start a response to some transmission with listen before talk (LBT), such as before acknowledging an SPS occasion or before transmitting an SBS based UL transmission. This proposal requires an LBT gap between the DL and UL transmission. Additionally, all UEs have to perform LBT to transmit on the DL. This proposal avoids the need for the UE to detect eNB transmission, but at the cost of additional LBT overhead. It is envisioned that a gNB exchange signaling to enter into and return form such a mode of operation at need. In this way, the additional overhead requirement may be avoided in scenarios in which one or more of the options under the first proposal prove sufficient.

Figure 4:
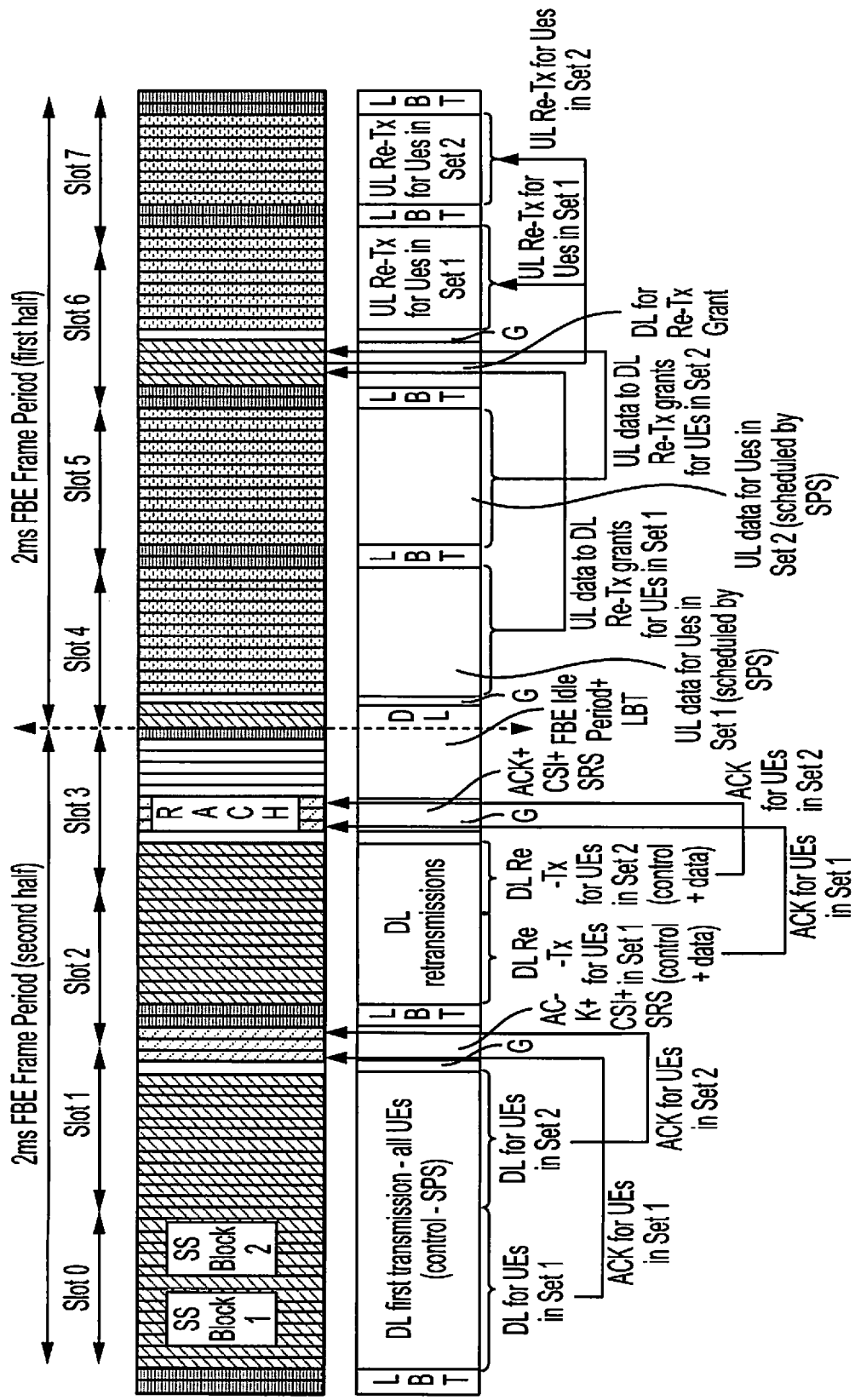
FIG. 4 is a block diagram illustrating transmission by frame based equipment according to NR-U without provision for transmission detection uncertainty according to some embodiments of the present disclosure.

Turning to FIG. 4, an example of transmission by frame based equipment according to NR-U is shown that does not have provision for transmission detection uncertainty. Here, there are no LBT occasions provisioned immediately before UL ACK occasions for any UEs, and only UEs configured as Set 2 have LBT occasions configured for their UL data transmissions and data retransmissions. The Set 1 UEs have a frame start that is earliest compared to other sets of UEs, such as UEs of Set 2. UEs of Set 2 have a later frame start, it is possible that the channel was lost due to failure of UEs of Set 1 to transmit or retransmit data. Accordingly, the LBT occasions are provided for UEs of Set 2 to address this issue, and not to address transmission detection uncertainty.

Figure 5:
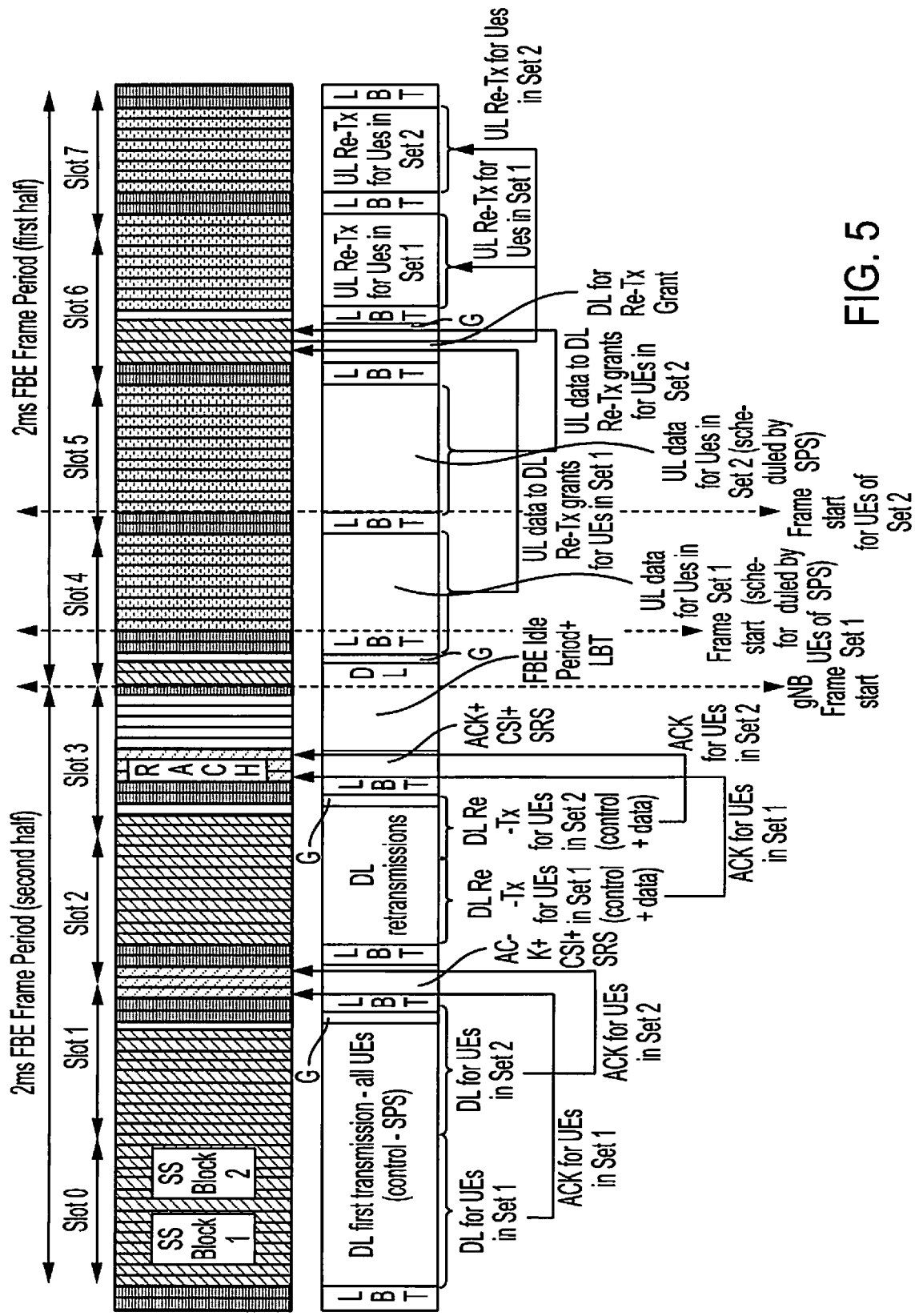
FIG. 5 is a block diagram illustrating transmission by frame based equipment according to NR-U with provision of LBT gaps for each uplink (UL) transmission for all UE occasions according to some embodiments of the present disclosure.
Figure 6:
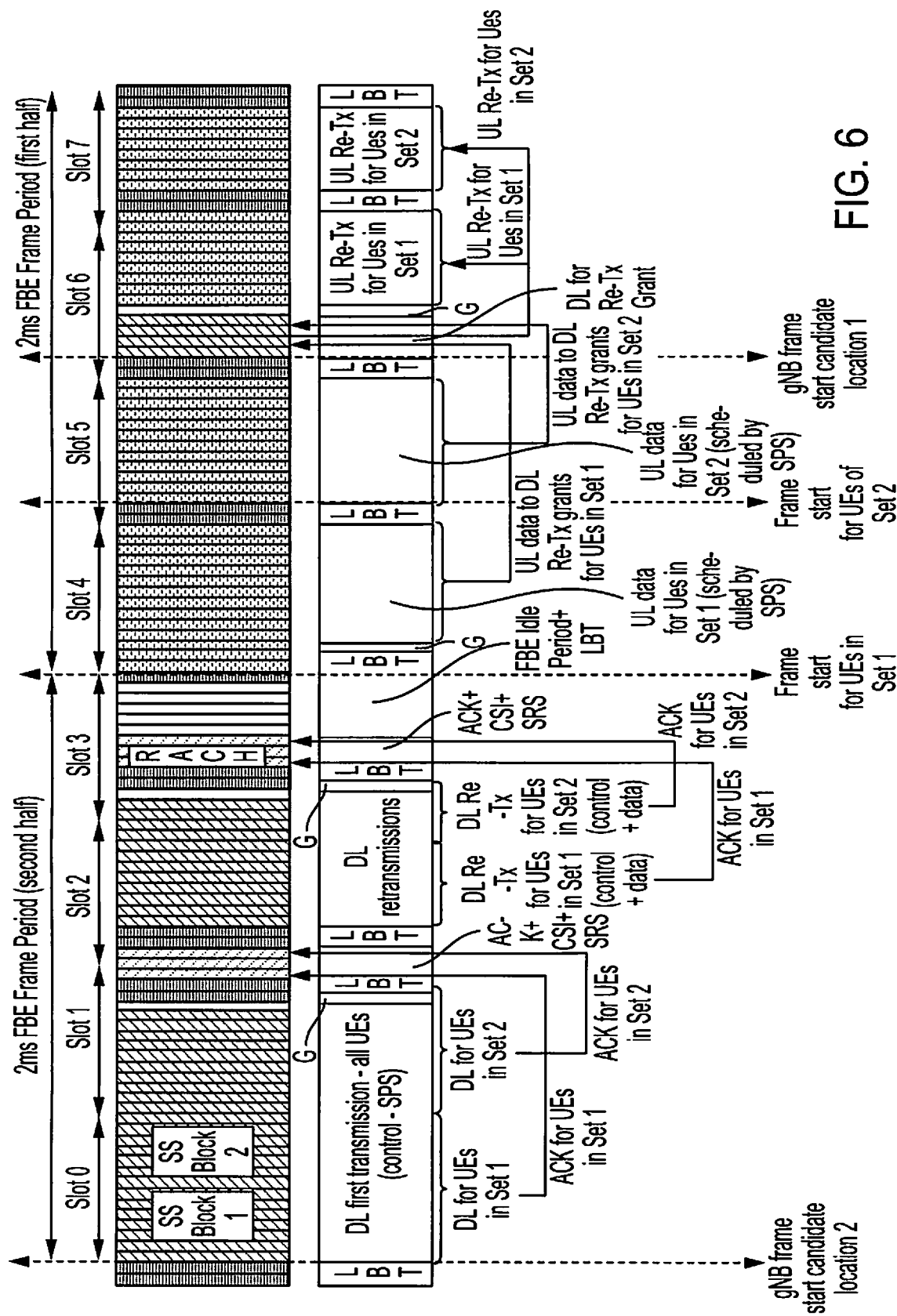
FIG. 6 is a block diagram illustrating transmission by frame based equipment according to NR-U with frame structure optimization according to some embodiments of the present disclosure.

Turning to FIG. 5, another example is shown of transmission by frame based equipment according to NR-U with provision of LBT gaps for each uplink (UL) transmission for all UE occasions. Accordingly, there are LBT occasions provided immediately prior to each UL ACK transmission, each UL data transmission, and each UL data retransmission for all UEs. However, turning to FIG. 6, it is envisioned that frame structure may be optimized assuming that UL SPS and DL SPS are used which do not require DL grants and need provision for ACK respectively, in this case, UES of Set 1 and Set 2 have LBT occasions provisioned immediately before their respective UL ACK occasions, but the UEs of Set 1 do not have LBT occasions provisioned immediately prior to their respective occasions for UL data retransmissions. The frame start for UEs of Set 1 is also moved to the beginning of Slot 4, which allows the UL data transmission for UEs of Set 1 to start immediately after an LBT occasion at the end of Slot 3.

The present disclosure also extends the above to multi transmit receive point (TRP) association. For the single TRP case, it is clear which device is the initiating device and which one is the responding device. However, for multi-TRP transmission scenario, this association is not entirely clear. The present disclosure proposes to allow a UE to be associated with multiple gNBs/TRPs at the same time, determine frame LBT success based on transmissions from more than one gNB/TRP, and act as a responding device at the same time to one or more gNBs/TRPs. Allowing a UE to be associated with multiple TRPs at the same as a responding device can be performed, for example, by defining an association set of TRPs for each UE. It is envisioned that the set may semi-statically change by RRC configuration or MAC signaling. It is also envisioned that this set could be a large set and the UE can determine a successful frame transmission at the gNB as long as it detects any one or more of the TRPs to be active in a frame. Accordingly, the UE can respond on the UL without LBT as long as any one of these TRPs transmits. However, the UE may be served from only a subset of TRPs in a given frame in the DL and UL. This subset can be the scheduling set (e.g., can be determined semi-statically, or in a UE transparent manner, or by DCI using TCI state signaling). The multi-TRP association proposed herein increases robustness as the failure of LBT at one TRP or failure to detect the transmission from one TRP will not restrict the UE's ability to transmit on the UL.

Figures 7A, 7B:
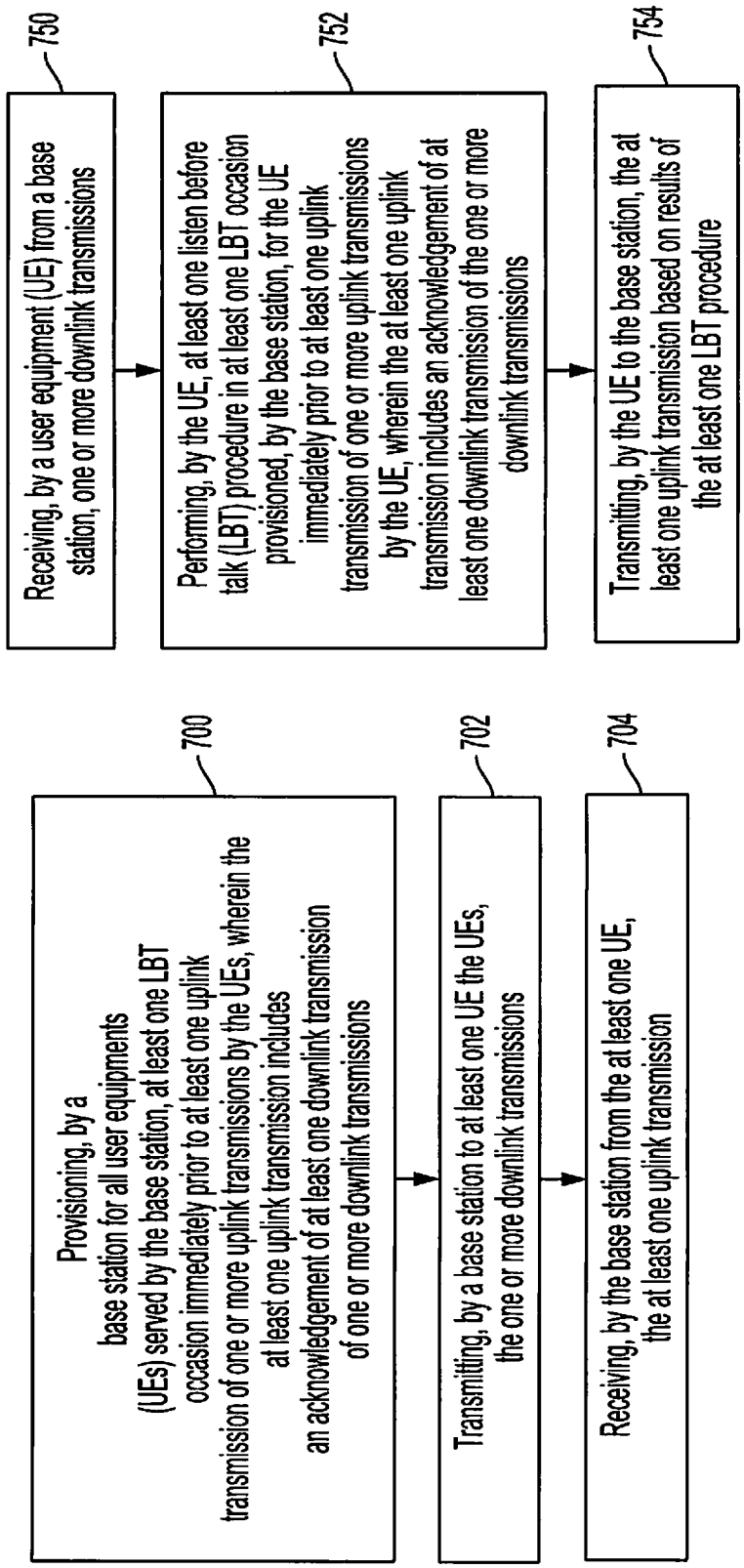
FIG. 7A is a block diagram illustrating example blocks of a wireless communication procedure carried out by a base station configured according to some embodiments of the present disclosure.
FIG. 7B is a block diagram illustrating example blocks of a wireless communication procedure carried out by a user equipment (UE) configured according to some embodiments of the present disclosure.

Turning now to FIG. 7A, a method of wireless communication performed by a base station begins at block 700. Block 700 entails provisioning, by a base station for all user equipments (UEs) served by the base station, at least one LBT occasion immediately prior to at least one uplink transmission of one or more uplink transmissions by the UEs. The at least one uplink transmission includes an acknowledgement of at least one downlink transmission of one or more downlink transmissions. Processing may proceed from block 700 to block 702.

Block 702 includes transmitting, by the base station to the UEs, the one or more do shirk transmissions. It is envisioned that the at least one downlink transmission may be semi-persistently scheduled (SPS). It is also envisioned that the downlink transmission may include control signaling, data transmission, and/or data retransmissions. Processing may proceed from block 702 to bock 704.

Block 704 includes receiving, by the base station from one of the UEs, the at least one uplink transmission. It is envisioned that the at least one uplink transmission may correspond to an acknowledgement, a data transmission, and/or a data retransmission. For example, an uplink transmission of the one or more uplink transmissions may correspond to an acknowledgement scheduled in response to a downlink data transmission or a downlink data retransmission. In this case, it is envisioned that the downlink data transmission or the downlink data retransmission may be semi-persistently scheduled (SPS). Alternatively or additionally, it is envisioned that the at least one uplink transmission includes an uplink data retransmission scheduled in response to at least one other downlink transmission of the one or more downlink transmissions, and that the uplink data retransmission may be semi-persistently scheduled (SPS). After block 704, processing may end. Alternatively, processing may return from block 704 to block 700 or block 702.

In the process of FIG. 7A, it is envisioned that the at least one UE may be associated to multiple transmit receive points (TRPs) at the same time. For example, an association set of the multiple TRPs may semi-statically change in response to radio resource control (RRC) configuration or media access control (MAC) signaling by the base station. Additionally, the at least one UE may determine a successful frame transmission by the base station as long as it detects at least one of the TRPs to be active in a corresponding frame. Also, the at least one UE may be configured to respond via uplink transmission without performing LBT as long as at least one of the TRPs transmits. Further, the at least one UE may be configured to be served by a subset of less than all of the TRPs in a frame for downlink and uplink transmissions. Further still, the subset of less than all TRPs may correspond to a scheduling set determined at least one of semi-statically, in a UE transparent manner, or by downlink control information (DCI) using transmission configuration indication (TCI).

Referring to FIG. 7B, a method of wireless communication by a user equipment begins at block 750. At block 750, the UE may receive, from a base station, one or more downlink transmissions. It is envisioned that the at least one downlink transmission may be semi-persistently scheduled (SPS). Processing may proceed from block 750 to block 752.

Block 752 includes performing, by the UE, at least one listen before talk (LBT) procedure in at least one LBT occasion provisioned, by the base station, for the UE immediately prior to at least one uplink transmission of one or more uplink transmissions by the UE. The at least one uplink transmission includes an acknowledgement of at least one downlink transmission of the one or more downlink transmissions. It is additionally envisioned that at least one other uplink transmission of the one or more uplink transmissions may include an acknowledgement scheduled in response to at least one other downlink transmission of the one or more downlink transmissions. In this case, the at least one other downlink transmission may be a downlink data retransmission, and the downlink data retransmission may be semi-persistently scheduled (SPS). Alternatively or additionally, at least one other uplink transmission of the one or more uplink transmissions may include an uplink data transmission scheduled in response to at least one other downlink transmission of the one or more downlink transmissions, and the uplink data transmission may be semi-persistently scheduled (SPS). Processing may proceed from block 752 to block 754. Alternatively or additionally, the at least one uplink transmission may an uplink data retransmission scheduled in response to at least one other downlink transmission of the one or more downlink transmissions, and the uplink data retransmission may be semi-persistently scheduled (SPS).

Block 754 includes transmitting, by the UE to the base station, the at least one uplink transmission based on results of the at least one LBT procedure. Following block 754, processing may end. Alternatively, processing may return from block 754 to block 750 or block 752.

In the process of FIG. 7B, it is envisioned that the at least one UE may be associated to multiple transmit receive points (TRPs) at the same time. For example, an association set of the multiple TRPs may semi-statically change in response to radio resource control (RRC) configuration or media access control (MAC) signaling by the base station. Additionally, the at least one UE may determine a successful frame transmission by the base station as long as it detects at least one of the TRPs to be active in a corresponding frame. Also, the at least one UE may be configured to respond via uplink transmission without performing LBT as long as at least one of the TRPs transmits. Further, the at least one UE may be configured to be served by a subset of less than all of the TRPs in a frame for downlink, and uplink transmissions. Further still, the subset of less than all TRPs may correspond to a scheduling set determined at least one of semi-statically, in a UE transparent manner, or by downlink control information (DCI) using transmission configuration indication (TCI).

Figure 8:
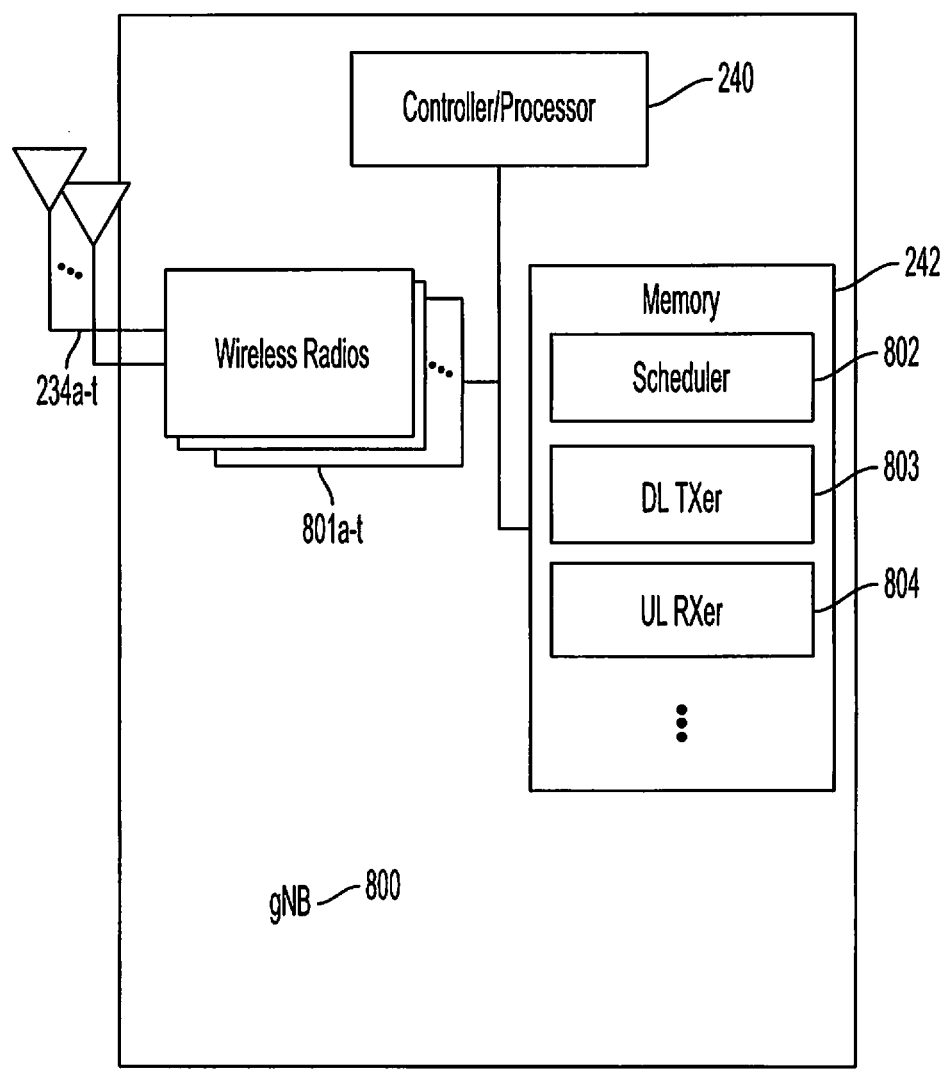
FIG. 8 is a block diagram illustrating a base station configured according to some embodiments of the present disclosure.

Turning now to FIG. 8, a base station 800, such as a NR-SS base station 105 (see FIG. 2), may have a controller/processor 240, a memory 242, and antennas 234a through 234t, as described above. The base station 800 may also have wireless radios 801a to 801t that comprise additional components also described above with reference to FIG. 2. The memory 242 of base station 800 stores algorithms that configure processor/controller 240 to carry out procedures as described above with reference to FIGS. 3-7.

Algorithms stored by memory 242 configure processor/controller 240 to carry out operations relating to wireless communication by the base station 800, as previously described. For example, scheduler 802 configures controller processor 240 to carry out operations that include provisioning LBT occasions for all UEs immediately prior to one or more uplink transmissions by the UEs in any manner previously described. Additionally, transmitter 803 configures controller processor 240 to carry out operations that include transmitting one or more downlink transmissions to the UEs in any manner previously described. Also, receiver 804 configures controller processor 240 to carry out operations that include receiving the one or more uplink transmission in any manner previously described.

Figure 9:
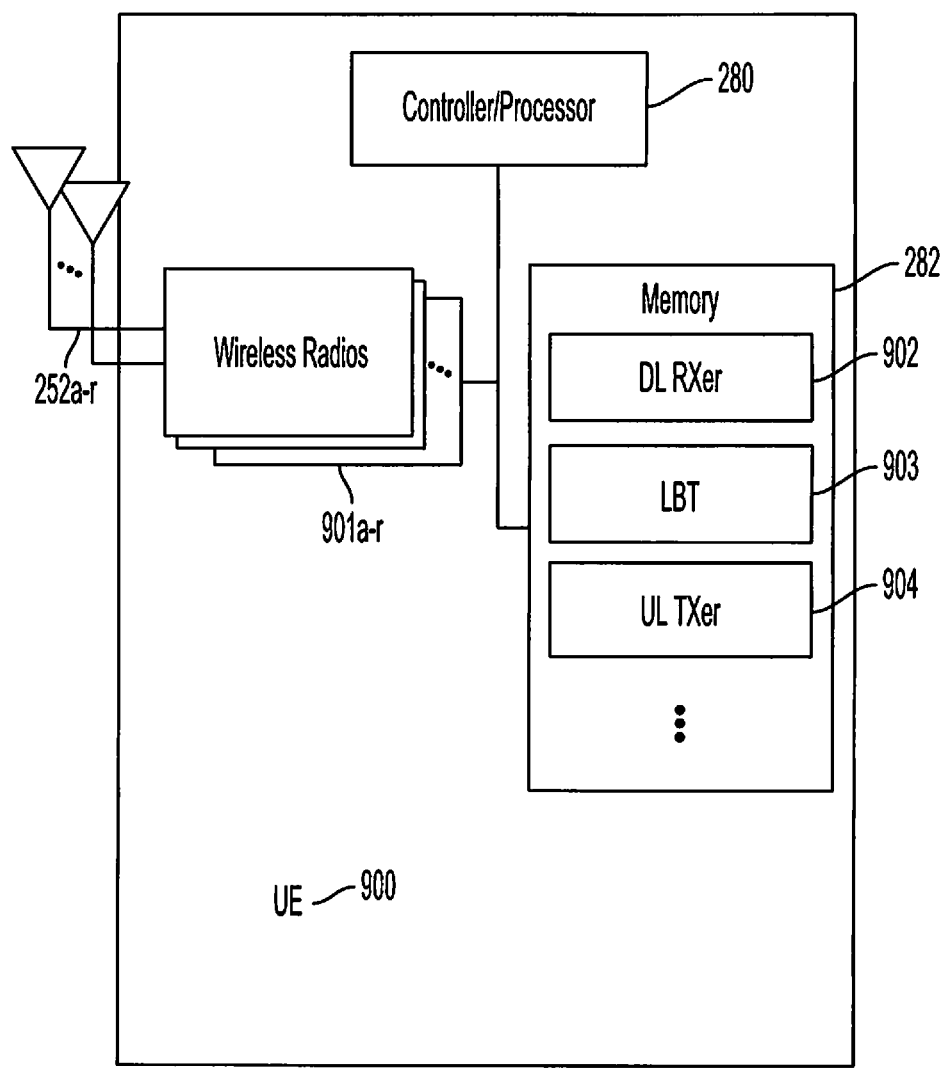
FIG. 9 is a block diagram illustrating a UE configured according to some embodiments of the present disclosure.

Turning now to FIG. 9, a UE 900, such as a UE 115 (see FIG. 2), may have a controller/processor 280, a memory 282, and antennas 252a through 252r, as described above. UE 900 may also have wireless radios 901a to 901r that comprise additional components also described above with reference to FIG. 2. The memory 282 of UE 900 stores algorithms that configure processor/controller 280 to carry out procedures as described above with reference to FIGS. 3-7.

Algorithms stored by memory 282 configure processor/controller 280 to carry out procedures relating to wireless communication by the UE 900, as previously described. For example, receiver 902 configures controller processor 280 to carry out operations that include receiving one or more downlink transmissions in any manner previously described. Additionally, LBT 903 configures controller processor 280 to carry out operations that include performing LBT in any manner previously described. Also, transmitter 904 configures controller processor 280 to carry out operations that include transmitting, based on the results of the LBT, one or more uplink transmission in any manner previously described.

Those of skill in the art would understand that information and signals may be represented using any of a variety of different technologies and techniques. For example, data, instructions, commands, information, signals, bits, symbols, and chips that stray be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 5-8) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    receiving, by a user equipment (UE) from a base station, one or more downlink transmissions;
    performing, by the UE, at least one listen before talk (LBT) procedure in at least one LBT occasion provisioned, by the base station, for the UE immediately prior to at least one uplink transmission of one or more uplink transmissions by the UE, wherein the at least one uplink transmission includes an acknowledgement of at least one downlink transmission of the one or more downlink transmissions, wherein the at least one LBT occasion are provisioned based on a first type of the at least one uplink transmission, wherein at least one other LBT occasion are not provisioned based on a second type of at least one other uplink transmission of the one or more uplink transmissions, wherein the second type of the at least one other uplink transmission comprises an uplink data retransmission;

transmitting, by the UE to the base station, the at least one uplink transmission based on results of the at least one LBT procedure.

2. The method of claim 1, wherein the at least one downlink transmission is semi-persistently scheduled (SPS).

3. The method of claim 1, wherein at least one other uplink transmission of the one or more uplink transmissions includes an acknowledgement scheduled in response to at least one other downlink transmission of the one or more downlink transmissions, wherein the at least one other downlink transmission is a downlink data retransmission.

4. The method of claim 3, wherein the downlink data retransmission is semi-persistently scheduled (SPS).

5. The method of claim 1, wherein at least one other uplink transmission of the one or more uplink transmissions includes an uplink data transmission scheduled in response to at least one other downlink transmission of the one or more downlink transmissions.

6. The method of claim 5, wherein the uplink data transmission is semi-persistently scheduled (SPS).

7. The method of claim 1, wherein the UE is associated to multiple transmit receive points (TRPs) at the same time.

8. The method of claim 7, wherein the association set of the multiple TRPs semi-statically changes in response to at least one of radio resource control (RRC) configuration or media access control (MAC) signaling.

9. The method of claim 7, wherein the UE determines a successful frame transmission by the base station as long as it detects at least one of the TRPs to be active in a corresponding frame.

10. The method of claim 7, wherein the UE is configured to respond via uplink transmission without performing LBT as long as at least one of the TRPs transmits.

11. The method of claim 7, wherein the UE is configured to be served by a subset of less than all of the TRPs in a frame for downlink and uplink transmissions.

12. The method of claim 11, wherein the subset of less than all TRPs corresponds to a scheduling set determined at least one of semi-statically, in a UE transparent manner, or by downlink control information (DCI) using transmission configuration indication (TCI).

13. A method of wireless communication, comprising:
provisioning, by a base station for all user equipments (UEs) served by the base station, at least one listen before talk (LBT) occasion immediately prior to at least one uplink transmission of one or more uplink transmissions by the UEs, wherein the at least one uplink transmission includes an acknowledgement of at least one downlink transmission of one or more downlink transmissions, wherein the at least one LBT occasion are provisioned based on a first type of the at least one uplink transmission, wherein at least one other LBT occasion are not provisioned based on a second type of at least one other uplink transmission of the one or more uplink transmissions, wherein the second type of the at least one other uplink transmission comprises an uplink data retransmission;
transmitting, by the base station to the UEs, the one or more downlink transmissions;
receiving, by the base station from at least one of the UEs, the at least one uplink transmission.

14. The method of claim 13, wherein the at least one downlink transmission is semi-persistently scheduled (SPS).

15. The method of claim 13, wherein at least one other uplink transmission of the one or more uplink transmissions includes an acknowledgement scheduled in response to at least one other downlink transmission of the one or more downlink transmissions, wherein the at least one other downlink transmission is a downlink data retransmission.

16. The method of claim 15, wherein the downlink data retransmission is semi-persistently scheduled (SPS).

17. The method of claim 13, wherein at least one other uplink transmission of the one or more uplink transmissions includes an uplink data transmission scheduled in response to at least one other downlink transmission of the one or more downlink transmissions.

18. The method of claim 17, wherein the uplink data transmission is semi-persistently scheduled (SPS).

19. The method of claim 13, wherein the at least one UE is associated to multiple transmit receive points (TRPs) at the same time.

20. The method of claim 19, wherein an association set of the multiple TRPs semi-statically changes in response to at least one of radio resource control (RRC) configuration or media access control (MAC) signaling by the base station.

21. The method of claim 19, wherein the at least one UE determines a successful frame transmission by the base station as long as it detects at least one of the TRPs to be active in a corresponding frame.

22. The method of claim 19, wherein the at least one UE is configured to respond via uplink transmission without performing LBT as long as at least one of the TRPs transmits.

23. The method of claim 19, wherein the at least one UE is configured to be served by a subset of less than all of the TRPs in a frame for downlink and uplink transmissions.

24. The method of claim 23, wherein the subset of less than all TRPs corresponds to a scheduling set determined at least one of semi-statically, in a UE transparent manner, or by downlink control information (DCI) using transmission configuration indication (TCI).

25. An apparatus for wireless communication, comprising:
at least one computer processor; and
at least one memory coupled to the at least one computer processor, wherein the at least one computer processor is configured to:
receive, by a user equipment (UE) from a base station, one or more downlink transmissions;
perform, by the UE, at least one listen before talk (LBT) procedure in at least one LBT occasion provisioned, by the base station, for the UE immediately prior to at least one uplink transmission of one or more uplink transmissions by the UE, wherein the at least one uplink transmission includes an acknowledgement of at least one downlink transmission of the one or more downlink transmissions, wherein the at least one LBT occasion are provisioned based on a first type of the at least one uplink transmission, wherein at least one other LBT occasion are not provisioned based on a second type of at least one other uplink transmission of the one or more uplink transmissions, wherein the second type of the at least one other uplink transmission comprises an uplink data retransmission;
transmit, by the UE to the base station, the at least one uplink transmission based on results of the at least one LBT procedure.

26. The apparatus of claim 25, wherein the at least one downlink transmission is semi-persistently scheduled (SPS).

27. The apparatus of claim 25, wherein at least one other uplink transmission of the one or more uplink transmissions includes an acknowledgement scheduled in response to at least one other downlink transmission of the one or more downlink transmissions, wherein the at least one other downlink transmission is a downlink data retransmission.

28. The apparatus of claim 25, wherein at least one other uplink transmission of the one or more uplink transmissions includes an uplink data transmission scheduled in response to at least one other downlink transmission of the one or more downlink transmissions.

29. The apparatus of claim 25, wherein the UE is associated to multiple transmit receive points (TRPs) at the same time.

30. An apparatus for wireless communication, comprising:
at least one computer processor; and
at least one memory coupled to the at least one computer processor, wherein the at least one computer processor is configured to:
provision, by a base station for all user equipments (UEs) served by the base station, at least one listen before talk (LBT) occasion immediately prior to at least one uplink transmission of one or more uplink transmissions by the UEs, wherein the at least one uplink transmission includes an acknowledgement of at least one downlink transmission of one or more downlink transmissions, wherein the at least one LBT occasion are provisioned based on a first type of the at least one uplink transmission, wherein at least one other LBT occasion are not provisioned based on a second type of at least one other uplink transmission of the one or more uplink transmissions, wherein the second type of the at least one other uplink transmission comprises an uplink data retransmission;
transmit, by the base station to the UEs, the one or more downlink transmissions;
receive, by the base station from at least one of the UEs, the at least one uplink transmission.

31. The apparatus of claim 30, wherein the at least one downlink transmission is semi-persistently scheduled (SPS).

32. The apparatus of claim 30, wherein at least one other uplink transmission of the one or more uplink transmissions includes an acknowledgement scheduled in response to at least one other downlink transmission of the one or more downlink transmissions, wherein the at least one other downlink transmission is a downlink data retransmission.

33. The apparatus of claim 30, wherein at least one other uplink transmission of the one or more uplink transmissions includes an uplink data transmission scheduled in response to at least one other downlink transmission of the one or more downlink transmissions.

34. The apparatus of claim 30, wherein the at least one UE is associated to multiple transmit receive points (TRPs) at the same time.

35. A non-transitory computer-readable medium having instructions recorded thereon that, when enacted by one or more computer processors, cause the one or more computer processors to:
receive, by a user equipment (UE) from a base station, one or more downlink transmissions;
perform, by the UE, at least one listen before talk (LBT) procedure in at least one LBT occasion provisioned, by the base station, for the UE immediately prior to at least one uplink transmission of one or more uplink transmissions by the UE, wherein the at least one uplink transmission includes an acknowledgement of at least one downlink transmission of the one or more downlink transmissions, wherein the at least one LBT occasion are provisioned based on a first type of the at least one uplink transmission, wherein at least one other LBT occasion are not provisioned based on a second type of at least one other uplink transmission of the one or more uplink transmissions, wherein the second type of the at least one other uplink transmission comprises an uplink data retransmission;
transmit, by the UE to the base station, the at least one uplink transmission based on results of the at least one LBT procedure.

36. The non-transitory computer-readable medium of claim 35, wherein the at least one downlink transmission is semi-persistently scheduled (SPS).

37. The non-transitory computer-readable medium of claim 35, wherein at least one other uplink transmission of the one or more uplink transmissions includes an acknowledgement scheduled in response to at least one other downlink transmission of the one or more downlink transmissions, wherein the at least one other downlink transmission is a downlink data retransmission.

38. The non-transitory computer-readable medium of claim 35, wherein at least one other uplink transmission of the one or more uplink transmissions includes an uplink data transmission scheduled in response to at least one other downlink transmission of the one or more downlink transmissions.

39. The non-transitory computer-readable medium of claim 35, wherein the UE is associated to multiple transmit receive points (TRPs) at the same time.

40. A non-transitory computer-readable medium having instructions recorded thereon that, when enacted by one or more computer processors, cause the one or more computer processors to:
provision, by a base station for all user equipments (UEs) served by the base station, at least one listen before talk (LBT) occasion immediately prior to at least one uplink transmission of one or more uplink transmissions by the UEs, wherein the at least one uplink transmission includes an acknowledgement of at least one downlink transmission of one or more downlink transmissions, wherein the at least one LBT occasion are provisioned based on a first type of the at least one uplink transmission, wherein at least one other LBT occasion are not provisioned based on a second type of at least one other uplink transmission of the one or more uplink transmissions, wherein the second type of the at least one other uplink transmission comprises an uplink data retransmission;
transmit, by the base station to the UEs, the one or more downlink transmissions;
receive, by the base station from at least one of the UEs, the at least one uplink transmission.

41. The non-transitory computer-readable medium of claim 40, wherein the at least one downlink transmission is semi-persistently scheduled (SPS).

42. The non-transitory computer-readable medium of claim 40, wherein at least one other uplink transmission of the one or more uplink transmissions includes an acknowledgement scheduled in response to at least one other downlink transmission of the one or more downlink transmissions, wherein the at least one other downlink transmission is a downlink data retransmission.

43. The non-transitory computer-readable medium of claim 40, wherein at least one other uplink transmission of the one or more uplink transmissions includes an uplink data transmission scheduled in response to at least one other downlink transmission of the one or more downlink transmissions.

44. The non-transitory computer-readable medium of claim 40, wherein the at least one UE is associated to multiple transmit receive points (TRPs) at the same time.

* * * * *